(12) United States Patent
Dunne

(10) Patent No.: US 9,879,995 B2
(45) Date of Patent: Jan. 30, 2018

(54) SYSTEM AND METHOD FOR SUPERIMPOSING A VIRTUAL AIMING MECHANISM WITH A PROJECTED SYSTEM BEAM IN A COMPACT LASER-BASED RANGEFINDING INSTRUMENT

(75) Inventor: Jeremy G. Dunne, Parker, CO (US)

(73) Assignees: LASER TECHNOLOGY, INC., Centennial, CO (US); KAMA-TECH (HK) LIMITED, Tsim Sha Tsui (CN)

( * ) Notice: Subject to any disclaimer, the term of this patent is extended or adjusted under 35 U.S.C. 154(b) by 788 days.

(21) Appl. No.: 13/615,172

(22) Filed: Sep. 13, 2012

(65) Prior Publication Data

US 2014/0071425 A1    Mar. 13, 2014

(51) Int. Cl.
G01C 3/08        (2006.01)
G01C 15/00       (2006.01)
G01S 17/36       (2006.01)
G01S 7/481       (2006.01)

(52) U.S. Cl.
CPC .......... *G01C 15/002* (2013.01); *G01S 7/4813* (2013.01); *G01S 17/36* (2013.01)

(58) Field of Classification Search
USPC .................................... 356/4.01, 5.01, 5.09
See application file for complete search history.

(56) References Cited

U.S. PATENT DOCUMENTS

| | | | |
|---|---|---|---|
| 4,533,224 A * | 8/1985 | Ou .............................. | 396/322 |
| 4,567,446 A | 1/1986 | Konishi | |
| 5,146,079 A | 9/1992 | Lisco | |
| 5,477,321 A * | 12/1995 | Johnson ....................... | 356/319 |
| 5,612,779 A | 3/1997 | Dunne | |
| 5,652,651 A | 7/1997 | Dunne | |
| 5,703,678 A | 12/1997 | Dunne | |
| 5,880,821 A | 3/1999 | Dunne | |
| 6,043,868 A | 3/2000 | Dunne | |
| 6,057,910 A | 4/2000 | Kaida et al. | |

(Continued)

FOREIGN PATENT DOCUMENTS

CN       201876545 U       6/2011
CN       101852851 B       6/2012

(Continued)

OTHER PUBLICATIONS

PCT International Search Report and Written Opinion PCT/US2013/059023, dated Dec. 12, 2013, 11 pgs.

(Continued)

*Primary Examiner* — Samantha K Abraham
(74) *Attorney, Agent, or Firm* — William J. Kubida; Hogan Lovells US LLP

(57) ABSTRACT

A system and method for superimposing a virtual aiming mechanism with a projected system beam in a compact laser-based rangefinding instrument such as a laser-based tape measure which employs a laser rangefinding system beam and visible light beam to enable a user to merely pick up the instrument and, if the visible beam can be seen, merely aim the device without sighting by placing the resultant visible light dot on the target itself. Alternatively, if the beam cannot be seen, the user can sight through the instrument viewing aperture and see a virtual visible dot and superimpose it upon his view of the target.

38 Claims, 6 Drawing Sheets

(56) References Cited

U.S. PATENT DOCUMENTS

| | | |
|---|---|---|
| 6,226,077 B1 | 5/2001 | Dunne |
| 6,445,444 B2 | 9/2002 | Dunne |
| 6,608,677 B1 * | 8/2003 | Ray et al. ............... 356/301 |
| 6,658,329 B1 | 12/2003 | Howard et al. |
| 6,756,578 B1 | 6/2004 | Kaiser |
| 7,301,616 B2 * | 11/2007 | Foley ................... 356/141.3 |
| 7,667,598 B2 | 2/2010 | Yenisch et al. |
| 2001/0012104 A1 | 8/2001 | Dunne |
| 2002/0190890 A1 | 12/2002 | Pergande |
| 2003/0076484 A1 | 4/2003 | Bamji et al. |
| 2005/0174560 A1 | 8/2005 | Imber et al. |
| 2005/0200831 A1 | 9/2005 | Staley, III et al. |
| 2005/0275826 A1 | 12/2005 | Ohtomo et al. |
| 2006/0247608 A1 * | 11/2006 | Hahn et al. ............... 606/5 |
| 2006/0285233 A1 | 12/2006 | Dunne |
| 2007/0127009 A1 | 6/2007 | Chen et al. |
| 2007/0182952 A1 | 8/2007 | Nishita et al. |
| 2008/0218743 A1 | 9/2008 | Stetten et al. |
| 2009/0046271 A1 | 2/2009 | Constantikes |
| 2010/0045966 A1 | 2/2010 | Cauquy et al. |
| 2010/0271616 A1 | 10/2010 | Suzuki et al. |
| 2011/0131824 A1 | 6/2011 | Yanobe et al. |
| 2011/0216305 A1 * | 9/2011 | Hayashi et al. ........... 356/4.01 |
| 2011/0279808 A1 | 11/2011 | Dunne |
| 2011/0292371 A1 | 12/2011 | Chang |
| 2012/0140201 A1 * | 6/2012 | Grauslys et al. ......... 356/4.01 |
| 2012/0262730 A1 | 10/2012 | Brown et al. |
| 2014/0071432 A1 | 3/2014 | Dunne |
| 2014/0307248 A1 | 10/2014 | Giger et al. |

FOREIGN PATENT DOCUMENTS

| | | |
|---|---|---|
| EP | 1102034 B1 | 5/2006 |
| EP | 1903302 A2 | 3/2008 |
| JP | 09304055 A | 11/1997 |
| KR | 20070103533 A | 10/2007 |
| KR | 20090104326 A | 10/2009 |
| KR | 20090121609 A | 11/2009 |

OTHER PUBLICATIONS

PCT International Search Report and Written Opinion PCT/US2013/059037, dated Dec. 16, 2013, 14 pgs.

Patent Cooperation Treaty International Preliminary Report on Patentability and Written Opinion of the International Searching Authority; PCT/US2013/059032; dated Mar. 17, 2015; 12 pages.

PCT International Search Report and Written Opinion, dated Jan. 11, 2016, International Application No. PCT/US15/54167, 10 pages.

Extended European Search Report for Application No. 13837644.7 dated Apr. 1, 2016 (8 pages).

Australian Patent Examination Report No. 1 for Patent Application No. 2013315687, dated Sep. 19, 2016, 2 pgs.

* cited by examiner

SYSTEM AND METHOD FOR SUPERIMPOSING A VIRTUAL AIMING MECHANISM WITH A PROJECTED SYSTEM BEAM IN A COMPACT LASER-BASED RANGEFINDING INSTRUMENT

CROSS REFERENCE TO RELATED PATENT APPLICATIONS

The present invention is related to the subject matter disclosed in U.S. patent application Ser. No. 13/615,143 for: "System and Method for a Rangefinding Instrument Incorporating Pulse and Continuous Wave Signal Generating and Processing Techniques for Increased Distance Measurement Accuracy" and Ser. No. 13/615,215 for: "Self-Aligned Aiming System and Technique for a Laser Rangefinder Incorporating a Retroreflector" both assigned to the assignees hereof and filed on even date herewith, the disclosures of which are herein specifically incorporated by this reference in their entirety.

BACKGROUND OF THE INVENTION

The present invention relates, in general, to the field of laser rangefinders and rangefinding instruments. More particularly, the present invention relates to a system and method for superimposing a virtual aiming mechanism with a projected system beam in a compact laser-based rangefinding instrument such as a laser-based tape measure.

Numerous laser-based devices have been introduced for measuring distances in situations in which traditional tape measures have previously been employed. For such applications, compact design and cost considerations are important factors in addition to overall device accuracy and ease of use. To date, however, none have been able to adequately fulfill all of these criteria and many utilize awkward structural elements or prisms as device aiming mechanisms. Moreover, while some existing devices may employ aiming mechanisms which are minimally acceptable in relatively low-light level indoor applications, none have been able to function equally well for much brighter ambient light conditions such as are encountered in outdoor uses.

Therefore, a need exists for a compact, low cost rangefinding instrument which is accurate and easy for a user to aim at a particular target point. Further, it would be highly desirable to provide a system and method for superimposing a virtual aiming mechanism with a projected system beam in a laser-based rangefinding instrument which provides an easily viewable aiming point to the user under all ambient light level conditions, both indoors and outside.

SUMMARY OF THE INVENTION

Disclosed herein is a system and method for superimposing a virtual aiming mechanism with a projected system beam in a compact laser-based rangefinding instrument such as a laser-based tape measure. The system and method of the present invention advantageously employs a laser rangefinding system beam and visible light beam which allows a user to merely pick up an instrument and, if the visible beam can be seen, merely aim the device without sighting by placing the resultant visible light dot on the target itself. Alternatively, if the beam cannot be seen, the user can sight through the instrument viewing aperture and see a virtual visible dot which he can then superimpose upon the view of the target. In either case, aiming of the instrument is accomplished by actually looking at the target as one is aiming at the target providing much enhanced ease of use.

Particularly disclosed herein is a rangefinding instrument comprising a system beam source operative for directing a rangefinding beam toward a target, a reflected beam receiver operative for receiving a reflected portion of the rangefinding beam from the target and a visible light source operative for directing a first portion of a visible light beam towards the target and a second portion of the visible light beam towards a user of the instrument.

In a particular embodiment of the system and method of the present invention disclosed herein, the visible light beam may further comprise a phase modulated, or continuous wave, distance measuring beam as disclosed, for example in the afore-mentioned United States Patent Application for "System and Method for a Rangefinding Instrument Incorporating Pulse and Continuous Wave Signal Generating and Processing Techniques for Increased Distance Measurement Accuracy".

Further disclosed herein is a method for providing an aiming mechanism for a rangefinding instrument comprising directing a rangefinding beam toward a target, also directing at least a first portion of a visible light beam towards the target and further directing at least a second portion of the visible light beam toward a user viewable aperture through which the target is also viewable.

Still further provided herein is a rangefinding instrument comprising a laser emitting diode for providing a rangefinding beam for direction to a target, a visible light emitter for providing a visible light beam for direction to the target and a visible light redirection device for directing at least a portion of the visible light beam toward an aperture in which the target and the at least a portion of the visible light beam are viewable by a user of the instrument.

Also further disclosed herein is a method for establishing a virtual aiming reference in a laser rangefinding instrument which comprises providing an eyepiece to enable a view of a target by a user; providing a visible laser beam and directing a first portion of the visible laser beam toward the target and a second portion toward the eyepiece.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
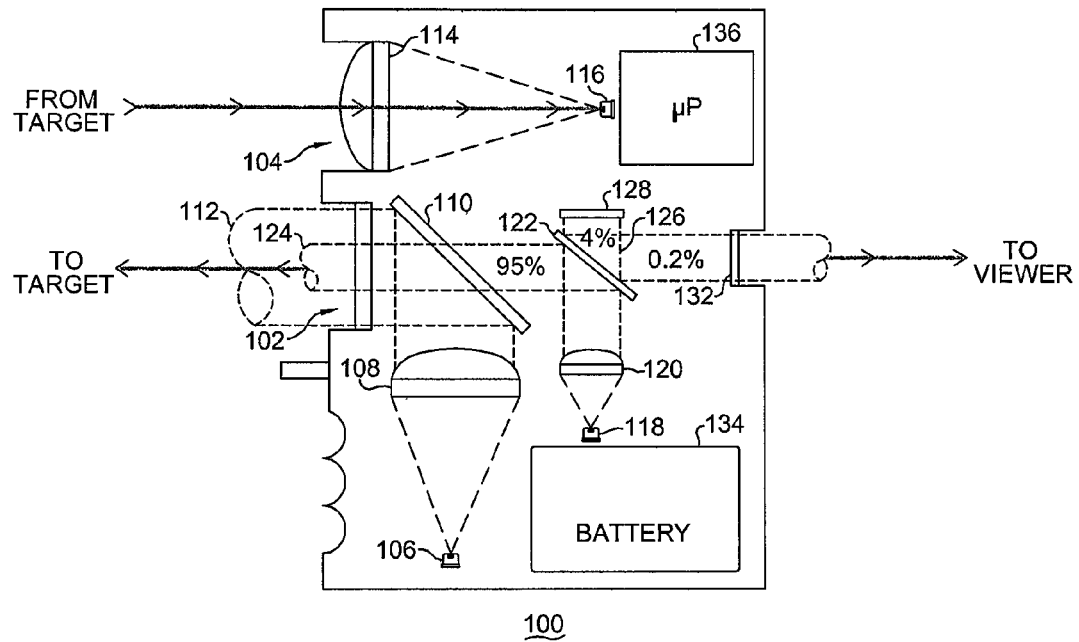
FIG. 1 is a simplified illustration of a representative embodiment of the system and method of the present invention for superimposing a virtual aiming mechanism with a projected system beam in a compact laser-based rangefinding instrument.

With reference now to FIG. 1, a simplified illustration of a representative embodiment of the system and method of the present invention is shown in the form of a laser-based rangefinding instrument 100. The system and method of the present invention is operative to effectively superimpose a virtual aiming point with a projected system beam as will be more fully described hereinafter.

The instrument 100, in pertinent part, comprises a laser beam transmission aperture 102 and a reflected laser beam reception aperture 104, the latter for reception of laser pulses transmitted to a selected target from the transmission aperture 102 and reflected back to the instrument 100. The laser beam reception aperture 104 further receives the reflected visible phase modulated beam in those embodiments of the instrument 100 wherein the visible light source 118 (further described hereinafter) also comprises a phase modulated, or continuous wave, measuring beam.

The laser transmission system of the instrument 100 comprises a laser emitting diode 106 (or other similar signal producing mechanism) and a collimating lens 108. Laser light, typically infrared, is passed through the lens 108 to a mirror 110 whereupon it is redirected 90° toward the selected target through the laser transmission aperture 102 in the form of a laser beam 112. As previously described, laser light reflected from the target is received through the reception aperture 104 as well as lens 114 to be focused on a laser detection diode 116 or similar device comprising a part of the laser receiving system of the instrument 100.

The instrument 100 also comprises a visible light source 118 which is positioned adjacent a collimating lens 120 for directing light towards a partial (e.g. dichroic) mirror 122 positioned substantially as shown to redirect incident light 90° along a beam path 124 substantially coaxially with the laser beam 112. In the particular implementation shown, approximately 95% of the visible laser light incident upon the mirror 122 is reflected towards the target along beam path 124 while about 4% is passed through the dichroic mirror 122 towards a reflective surface 128 along beam path 126. Of the approximately 4% of the visible light incident upon the reflective surface 128 something on the order of about 0.2% is then redirected back towards the other side of the dichroic mirror 122 and then redirected 90° towards a viewer/user of the instrument 100 along path 130 and through viewing aperture 132.

Power for the electronic portions of the transmission, reception and other systems of the instrument 100 may be conveniently provided by a battery 134 as shown. A microprocessor section 136 is operatively coupled to a laser beam transmission section including the laser emitting diode 106 and a laser beam reception section including laser detection diode 116 to calculate the distance to the target based on the time of flight of various laser pulses.

Representative circuitry and associated signal processing techniques for a laser rangefinder are disclosed, for example, in the following United States Patents assigned to Laser Technology. Inc., assignee of the present invention: U.S. Pat. Nos. 5,574,552; 5,612,779; 5,652,651; 5,703,678; 5,880, 821; 6,057,910; 6,226,077 and 6,445,444. The disclosures of these patents are herein incorporated by this reference in their entirety.

Figure 2:
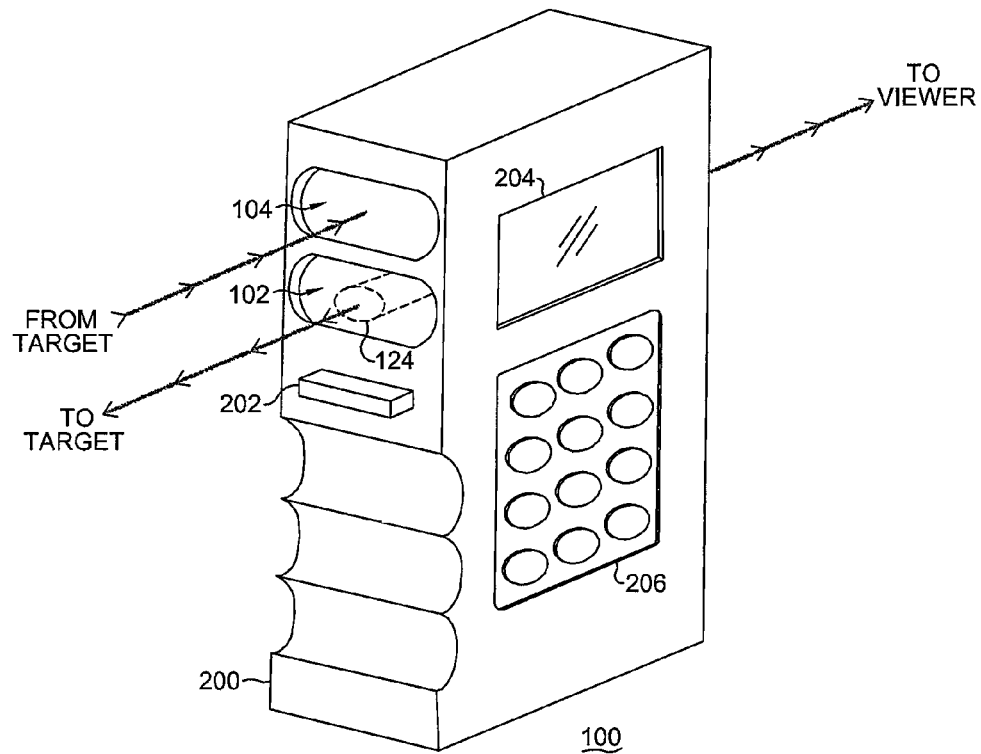
FIG. 2 is an isometric view of the representative embodiment of the instrument of the preceding figure illustrating, for example, a display and data input key pad.

With reference additionally now to FIG. 2, an isometric view of the representative embodiment of the instrument 100 in the preceding figure is shown. Like structure to that previously shown and described with respect to the preceding figure is like numbered and the forgoing description thereof shall suffice herefor.

The instrument 100 comprises a hand held housing 200 for containing the laser, optical and electronic systems previously described as well as a user actuatable switch 202. A display 204 may be utilized to indicate range, operational mode or other pertinent data to a user who can also enter data to the instrument 100 through, for example, a key pad 206. The display 204 and keypad 206 are also operatively coupled to the microprocessor 136.

In operation, particularly in outdoor or other well lit environments, the beam generated by the laser diode 106 in the form of laser beam 112 is very difficult, if not impossible, to see making aiming the device at a particular target problematic. As such, conventional devices have previously employed awkward, counterintuitive aiming systems.

On the other hand, the system and method of the present invention, an exemplary embodiment of which is instrument 100, provides a substantially coaxial beam of visible light along beam path 124 which may be easily viewed under most lower ambient light conditions such that the instrument 100 may be aimed simply by placing the resultant visible dot (e.g. red or other suitable color) on the target thereby ensuring that the laser beam 112 is also properly aimed. Alternatively, and under brighter ambient light conditions, a user of the instrument 100 may sight through the viewing aperture 132 and then effectively superimpose the visible light of a virtual dot reflected towards him by mirror 122 upon the desired target to ensure proper aiming.

In effect, the system and method of the present invention advantageously allows a user to pick up the instrument 100 and, if the visible beam can be seen, merely aim the device without sighting. Alternatively, if the beam cannot be seen, he can sight through the viewing aperture 132 and see a visible dot. In any event, aiming of the instrument 100 is accomplished by looking at the target as one is aiming at the target providing much enhanced ease of use.

It should be noted that, in a particular implementation of the system and method of the present invention, the laser beam 112 and visible beam path 124 are essentially coaxial, but need not be so exactly. In other words, their axes need not be precisely coincident but merely aligned in parallel to a common optical axis. Because the beams are effectively collimated at infinity, small eye movements do not serve to change the instrument 100 aiming point. Further since only a relatively small portion of the output of the visible light source 118 need be directed back through the viewing aperture 132, the secondary mirror 128 may be conveniently provided, for example, as a simple piece of glass with its opposite side coated black.

Figure 3A:
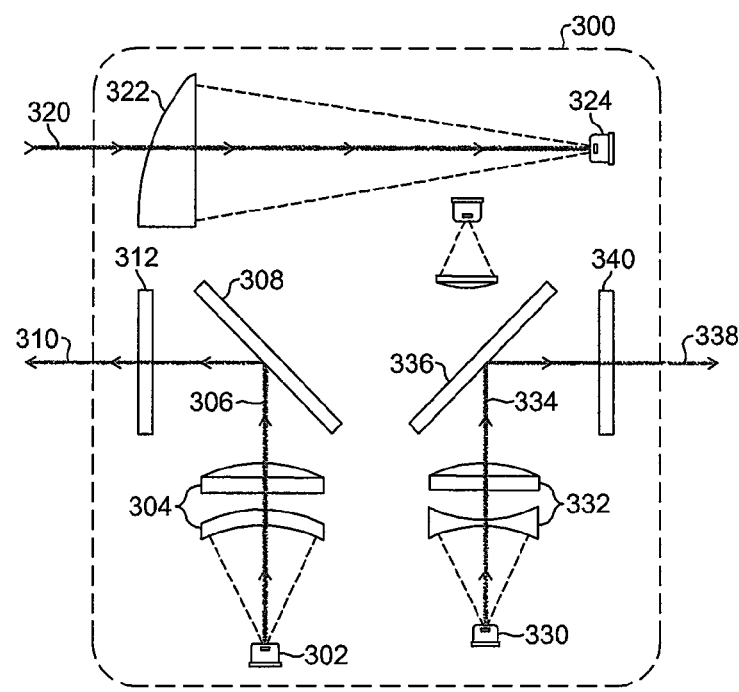
FIGS. 3A and 3B are simplified illustrations of another representative embodiment of the system and method of the present invention showing the pathways for the transmission and reception of a pulse modulated infrared (IR) laser beam and a visible phase modulated laser beam in addition to the provision of a separate visible head-up display aiming light source.
Figure 3B:
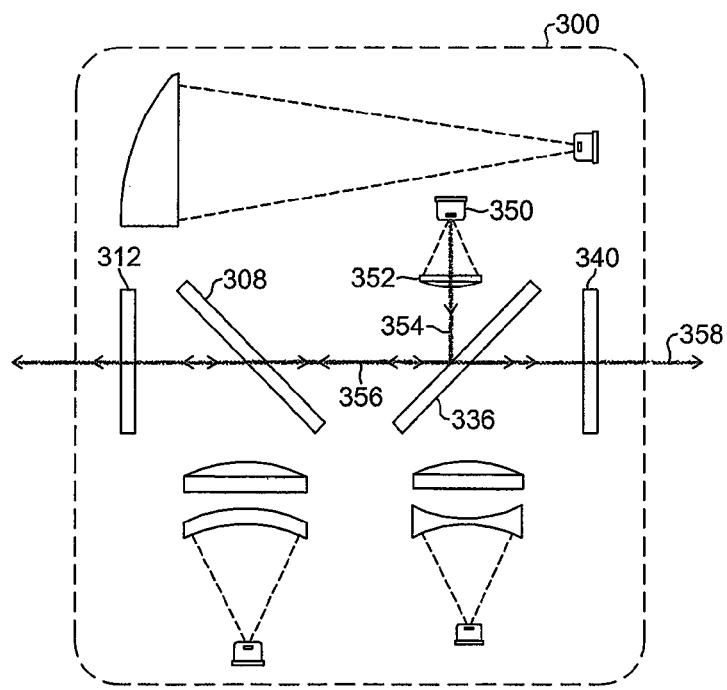

With reference additionally now to FIGS. 3A and 3B simplified illustrations of another representative embodiment of the system and method of the present invention are provided showing the pathways for the transmission and reception of a pulse modulated infrared (IR) laser beam and a visible, potentially phase modulated, laser beam in addition to the provision of a separate visible head-up display aiming light source.

With respect to these figures, the instrument 300 comprises a pulse modulated IR laser source 302 which projects a laser beam 306 through a pair of lenses 304. The laser beam 306, which in the embodiment illustrated may be a pulse modulated laser beam, is redirected 90° by a first IR partial (e.g. dichroic) mirror 308 to produce redirected laser beam 310 through window 312 towards a target (not shown).

Laser energy reflected by the target is received along laser reception pathway 320 through lens 322 and detected by laser detector 324. In the embodiment shown, a visible light source 330 is provided to project data and an aiming reticule along pathway 334 through lenses 332 for redirection by a second partial (e.g. dichroic) mirror 336 90° along redirected pathway 338 through window 340. The second dichroic mirror 336, in this embodiment, is oriented at essentially 90° to the first dichroic mirror 308. The visible light source 330 can be used to provide the user of the instrument 300 with a head-up display and "red dot" aiming reticule.

The instrument 300 also includes a visible, potentially phase modulated, laser beam source 350 which projects a visible laser beam 354 through an associated lens 352 for redirection 90° by the second dichroic mirror 336 along visible laser pathway 356. Visible laser pathway 356 passes through the first dichroic mirror 308 where it impinges upon and is at least partially reflected 180° back upon itself by the window 312 along return path 358 towards a user of the instrument 300. The return path 358 passes through the first and second dichroic mirrors 308, 336 respectively as well as window 340 to enable a user of the to see the visible, phase modulated laser beam 356 directed toward a target as a virtual dot superimposed upon the "red dot" from the visible light source 330.

In operation, window 312 is designed to allow approximately 95% transmission of the visible laser beam on visible laser pathway 356 and to provide approximately 5% reflectivity to the visible laser beam on return path 358. Assuming a 1 milliwatt visible laser beam exiting through window 312, only about 20 microwatts will be reflected back to the eye of a user of the instrument 300 resulting in a highly attenuated view of the exiting visible laser beam as a virtual dot for aiming the device which is aligned on the target exactly with the actual visible dot on the target.

Figure 4A:
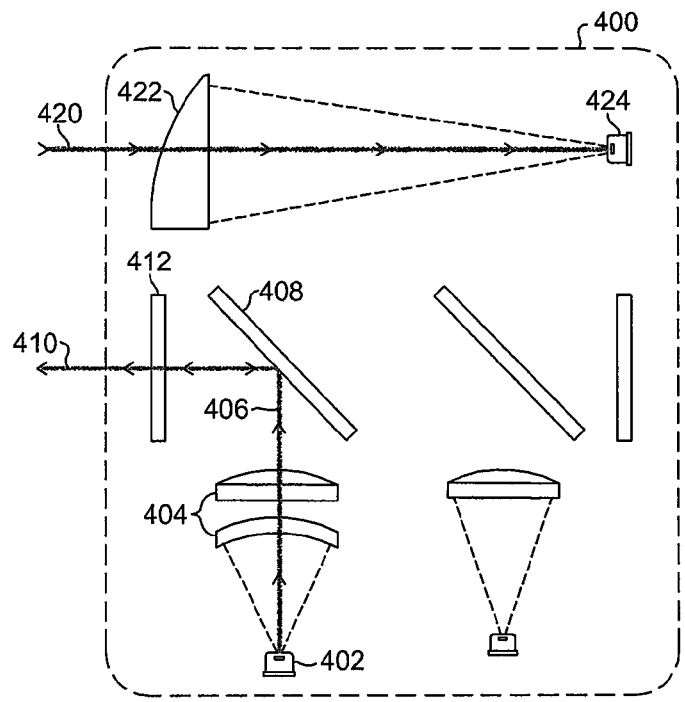
FIGS. 4A and 4B are additional simplified illustrations of yet another representative embodiment of the system and method of the present invention showing the pathways for the transmission and reception of a pulse modulated IR laser beam and a visible phase modulated laser beam which also provides a virtual aiming dot to a user.
Figure 4B:
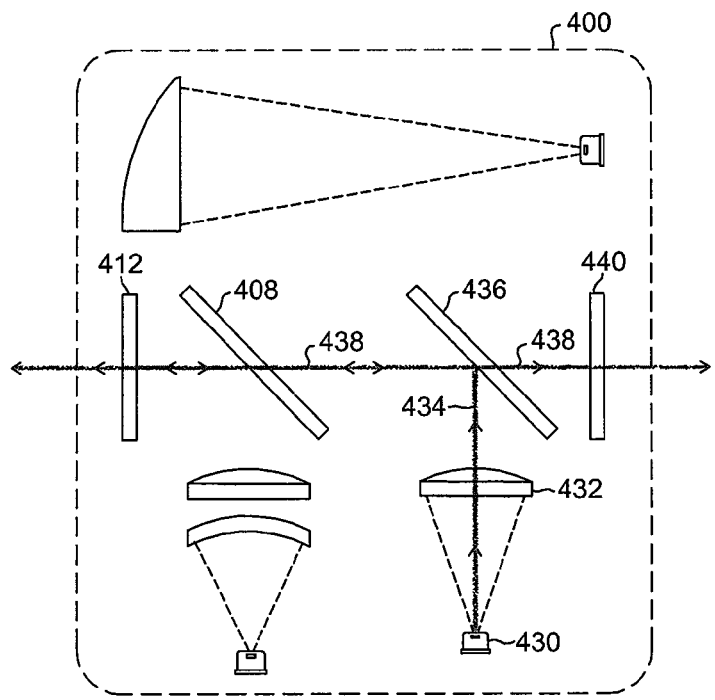

With reference additionally now to FIGS. 4A and 4B additional simplified illustrations of yet another representative embodiment of the system and method of the present invention are provided showing the pathways for the transmission and reception of a pulse modulated IR laser beam and a visible phase modulated laser beam which also provides a virtual aiming dot to a user.

With respect to these figures, the instrument 400 comprises an IR laser source 402 which projects a laser beam 406 through a pair of lenses 404. The laser beam 406, which in the embodiment illustrated may be a pulse modulated laser beam, is redirected 90° by a first partial (e.g. dichroic) mirror 408 to produce redirected laser beam 410 through window 412 towards a target.

Laser energy reflected by the target is received along laser reception pathway 420 through lens 422 and detected by laser detector 424. The instrument 400 also includes a visible, phase modulated laser beam source 430 which projects a visible laser beam 434 through an associated lens 432 for redirection 90° by a second partial (e.g. dichroic) mirror 436 along visible laser pathway 438. The second dichroic mirror 436, in this embodiment, is oriented at essentially parallel to the first dichroic mirror 408. Visible laser pathway 438 passes through the first dichroic mirror 408 where it impinges upon and is at least partially reflected 180° back upon itself by the window 412 towards a user of the instrument 400. The reflected portion of the visible laser light along pathway 438 passes through the first and second dichroic mirrors 408, 436 respectively as well as window 440 to enable a user of the to see the visible, phase modulated laser beam as a virtual dot for aiming the instrument 400.

As with the instrument 300 of FIGS. 3A and 3B, in operation, window 412 is designed to allow approximately 95% transmission of the visible laser beam and to provide approximately 5% reflectivity to the visible laser beam on pathway 438. Again assuming a 1 milliwatt visible laser beam exiting through window 412, only about 20 microwatts will be reflected back to the eye of a user of the instrument 400 resulting in a highly attenuated view of the exiting visible laser beam as a virtual dot for aiming the device which is aligned on the target exactly with the actual visible dot on the target.

Figure 5A:
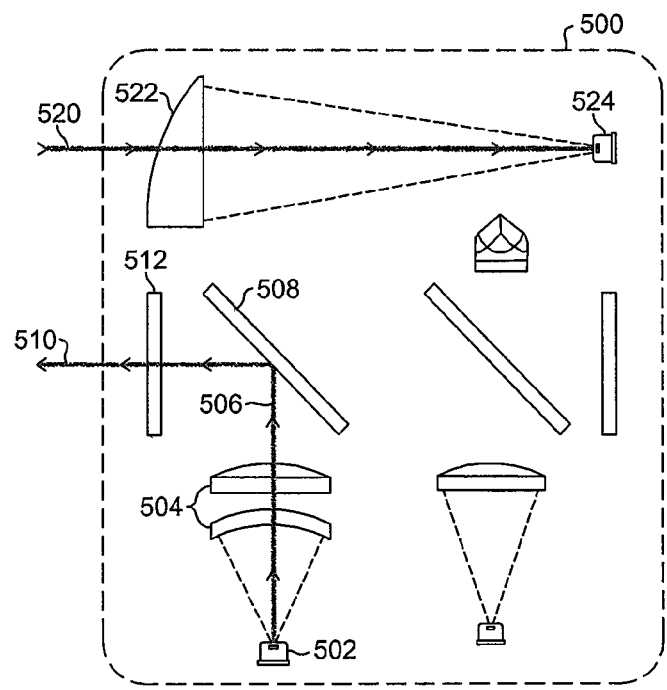
FIGS. 5A and 5B are still further simplified illustrations of another representative embodiment of the system and method of the present invention showing the pathways for the transmission and reception of a pulse modulated IR laser beam and a visible phase modulated laser beam which also provides a virtual aiming dot to a user through the incorporation of a retroreflector.
Figure 5B:
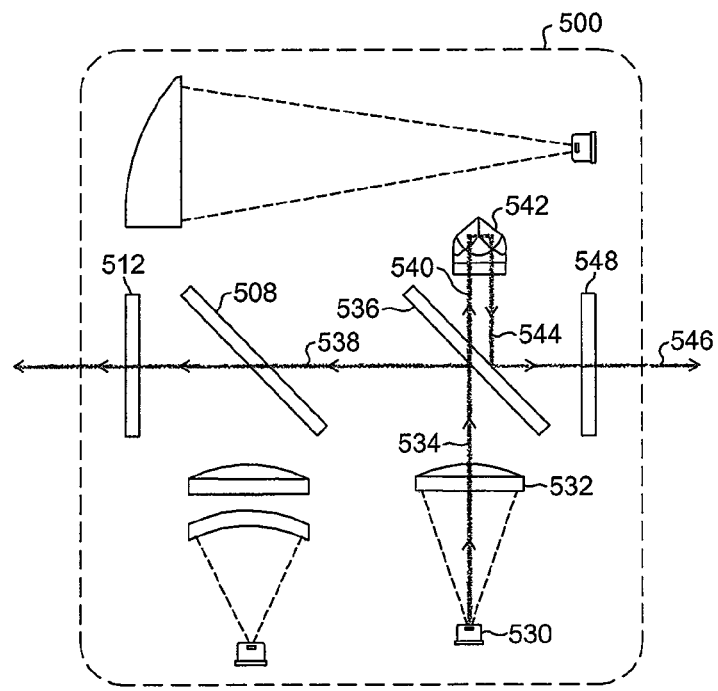

With reference additionally now to FIGS. 5A and 5B still further simplified illustrations of another representative embodiment of the system and method of the present invention are provided showing the pathways for the transmission and reception of a pulse modulated IR laser beam and a visible phase modulated laser beam which also provides a virtual aiming dot to a user through the incorporation of a retroreflector.

With respect to these figures, the instrument 500 comprises an IR laser source 502 which projects a laser beam 506 through a pair of lenses 504. The laser beam 506, which in the embodiment illustrated may be a pulse modulated laser beam, is redirected 90° by a first partial (e.g. dichroic) mirror 508 to produce redirected laser beam 510 through window 512 towards a target.

Laser energy reflected by the target is received along laser reception pathway 520 through lens 522 and detected by laser detector 524. The instrument 500 also includes a visible, phase modulated laser beam source 530 which projects a visible laser beam 534 through an associated lens 532 for redirection 90° by a second partial (e.g. dichroic) mirror 536 along visible laser pathway 538. The second dichroic mirror 536, in this embodiment, is oriented at essentially parallel to the first dichroic mirror 508. A portion of the visible laser beam 534 passes through the second dichroic mirror 536 where it impinges upon and is reflected 180° back upon itself by a retroreflector 542 along pathway 544. The retroreflector 542 may, alternatively, further comprise an associated attenuating glass element or attenuating coating to attenuate the portion of the visible laser beam along pathway 544. That portion of the visible laser beam along pathway 544 is then reflected 90° by a reflective surface of the dichroic mirror 536 along visible pathway 546 through window 548 towards a user of the instrument 500 to enable viewing of the visible, phase modulated laser beam as a virtual dot for aiming the instrument 500.

In operation, the retroreflector 542, such as those commercially available from Edmund Optics, Inc. Barrington, N.J., functions such that incident light is reflected back to the source, regardless of its orientation. As such, the retroreflector preserves the angle of incidence but adds a shift relative to its apex thus ensuring that visible laser pathway 538 and visible pathway 546 are aligned and coaxial when reflected off of the opposing sides of dichroic mirror 536.

Figure 5C:
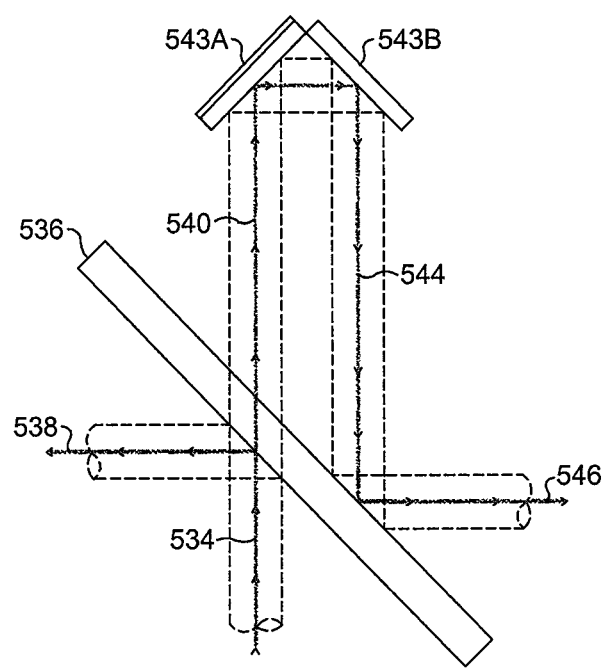
FIG. 5C illustrates an alternative to the retroreflector of FIGS. 5A and 5B through the use of a pair of perpendicularly disposed mirrored surfaces.

With reference additionally now specifically to FIG. 5C an alternative to the retroreflector of FIGS. 5A and 5B is provided through the use of a pair of perpendicularly disposed mirrored surfaces. With respect to this figure, like structure and beam pathways previously described are like numbered and the foregoing description thereof shall suffice herefor. In this embodiment of the instrument 500, the retroreflector 542 (FIGS. 5A and 5B) is substituted for by a pair of perpendicularly disposed mirrors 543A and 543B as shown. While visible laser pathway 538 and visible pathway 546 remain aligned when reflected off of the opposing sides of dichroic mirror 536 they are no longer exactly coaxial inasmuch as a slight shift has been now introduced. For this reason, the use of a retroreflector 542 has advantages over the use of mirrors 543A and 543B in terms of parts count and critical accuracy in presenting a virtual dot for aiming the device which is aligned on the target exactly with the actual visible dot on the target. As before, whether employing a retroreflector 542 or mirrors 543A, 543B the amount of visible laser light returned along visible pathway 546 should be in the range of approximately a few microwatts.

Figure 6A:
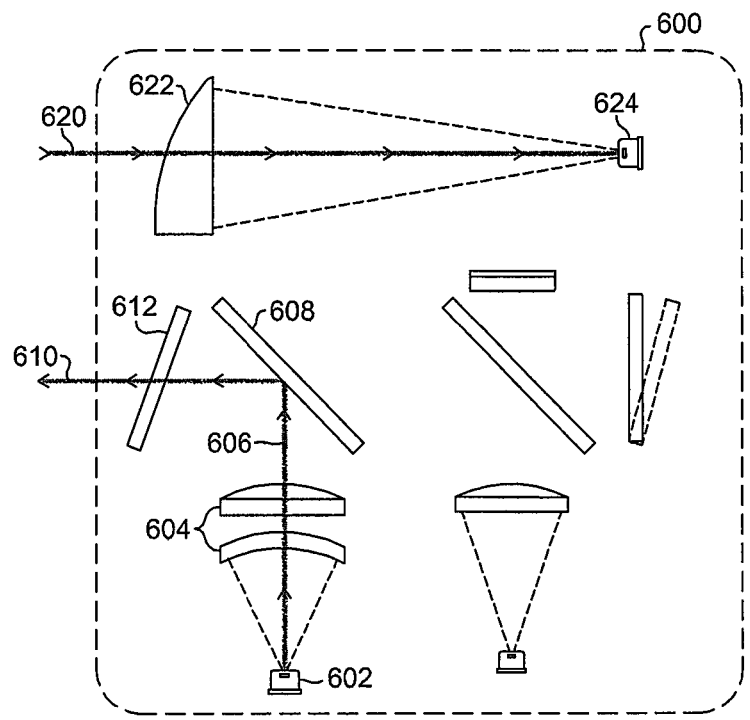
FIGS. 6A and 6B are further simplified illustrations of yet another representative embodiment of the system and method of the present invention showing the pathways for the transmission and reception of a pulse modulated IR laser beam and a visible laser beam with the instrument windows at other than 90° to the pathways to obviate ghost images being presented to a user of the instrument.
Figure 6B:
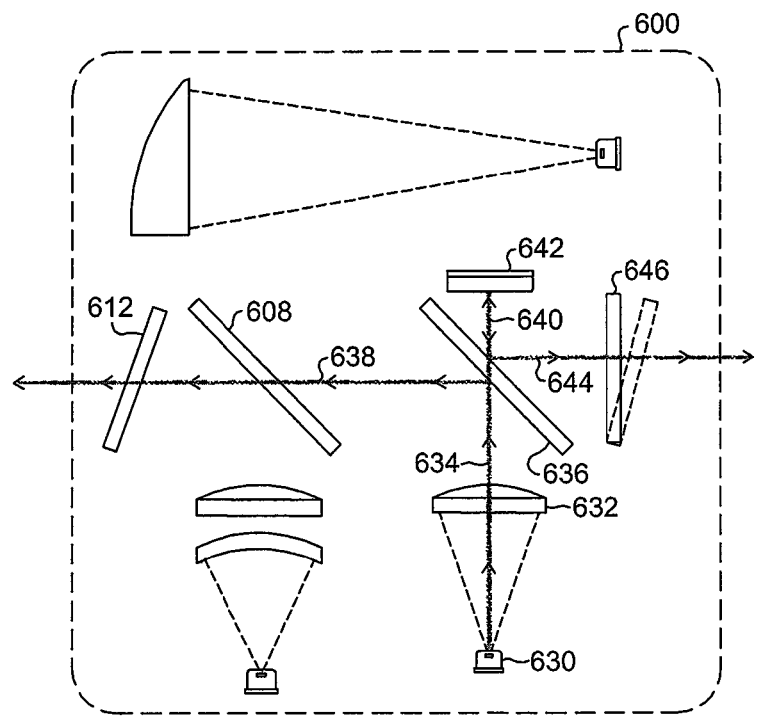

With reference additionally now to FIGS. 6A and 6B further simplified illustrations of yet another representative embodiment of the system and method of the present invention are provided showing the pathways for the transmission and reception of a pulse modulated IR laser beam and a visible laser beam with the instrument windows at other than 90° to the pathways to obviate ghost images being presented to a user of the instrument.

With respect to these figures, the instrument 600 comprises an IR laser source 602 which projects a laser beam 606 through a pair of lenses 604. The laser beam 606, which in the embodiment illustrated may be a pulse modulated laser beam, is redirected 90° by a first partial (e.g. dichroic) mirror 608 to produce redirected laser beam 610 through window 612 towards a target. As illustrated, window 612 may be positioned such that it does not lie perpendicularly transverse to the redirected laser beam 610 to eliminate the projection of potential ghost images back to a user of the instrument 600.

Laser energy reflected by the target is received along laser reception pathway 620 through lens 622 and detected by laser detector 624. The instrument 600 also includes a visible, phase modulated laser beam source 630 which projects a visible laser beam 634 through an associated lens 632 for redirection 90° by a second partial (e.g. dichroic) mirror 636 along visible laser pathway 638. The second dichroic mirror 636, in this embodiment, is also oriented essentially parallel to the first dichroic mirror 608. A portion of the visible laser beam 634 passes through the second dichroic mirror 636 where it impinges upon and is reflected 180° back upon itself by a mirror 642. Visible laser light reflected by the mirror 642 is then reflected 90° by a reflective surface of the dichroic mirror 636 along visible pathway 644 through window 646 towards a user of the instrument 600 to enable viewing of the visible, phase modulated laser beam as a virtual dot for aiming the instrument 600. As with window 612, window 646 may be positioned such that it does not lie perpendicularly transverse to the redirected laser beam 644 to eliminate the projection of potential ghost images back to a user of the instrument 600.

In this embodiment, the mirror 642 has an attenuating coating to ensure that the amount of visible laser light returned along visible pathway 644 should be in the range of approximately a few microwatts. The use of a flat mirror 642 introduces a slight coaxial shift as with the perpendicularly disposed mirrors 543A, 543B (FIG. 5C) but the pathways 638 and 644 nevertheless remain in alignment.

While there have been described above the principles of the present invention in conjunction with specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A rangefinding instrument comprising:
   a system beam source operative for directing a rangefinding beam toward a target;
   a reflected beam receiver operative for receiving a reflected portion of said rangefinding beam from said target; and
   a visible light emitting source operative for directing a first portion of a visible light beam towards said target and a second portion of said visible light beam towards a user of said instrument.

2. The rangefinding instrument of claim 1 wherein said rangefinding beam comprises a laser beam.

3. The rangefinding instrument of claim 2 wherein said laser beam comprises an infrared laser beam.

4. The rangefinding instrument of claim 1 wherein said rangefinding beam and said visible light beam are aligned substantially parallel to a common axis.

5. The rangefinding instrument of claim 4 wherein said rangefinding beam and said visible light beam are substantially coaxial.

6. The rangefinding instrument of claim 1 further comprising:
a partial mirror for intercepting said visible light beam and directing said first portion thereof towards said target and said second portion thereof towards said user.

7. The rangefinding instrument of claim 1 wherein said visible light beam comprises a phase modulated laser beam.

8. The rangefinding instrument of claim 1 wherein said first portion of said visible light beam comprises a higher percentage thereof than said second portion.

9. A method for providing an aiming mechanism for a rangefinding instrument comprising:
directing a rangefinding beam toward a target;
producing a visible light beam;
also directing at least a first portion of said visible light beam towards said target and
further directing at least a second portion of said visible light beam toward a user viewable aperture through which said target is also viewable.

10. The method of claim 9 wherein said directing of said rangefinding beam toward said target is carried out by a laser emitting diode.

11. The method of claim 9 wherein said also directing at least a first portion of said visible light beam is carried out by a partial mirror.

12. The method of claim 11 wherein said further directing at least a second portion of said visible light beam is also carried out by said partial mirror.

13. The method of claim 9 wherein said rangefinding beam and said first portion of said visible light beam are aligned substantially parallel to a common axis.

14. The method of claim 9 wherein said rangefinding beam and said first portion of said visible light beam are substantially coaxial.

15. The method of claim 9 further comprising:
phase modulating said visible light beam.

16. A rangefinding instrument comprising:
a laser emitting diode for providing a rangefinding beam for direction to a target;
a visible light emitter source for providing a visible light beam for direction to said target; and
a visible light redirection device for directing at least a portion of said visible light beam toward an aperture in which said target and said at least a portion of said visible light beam are viewable by a user of said instrument.

17. The rangefinding instrument of claim 16 further comprising:
a first partial mirror interposed between said laser emitting diode and said target for directing said rangefinding beam to said target.

18. The rangefinding instrument of claim 17 further comprising:
a collimating lens interposed between said laser emitting diode and said first partial mirror.

19. The rangefinding instrument of claim 17 wherein said visible light redirection device comprises:
a second partial mirror interposed between said visible light emitter and said first partial mirror.

20. The rangefinding instrument of claim 19 further comprising:
a collimating lens interposed between said second partial mirror and said visible light emitter.

21. The rangefinding instrument of claim 19 further comprising:
a mirror for redirecting at least a portion of said visible light passing through said second partial mirror toward said aperture.

22. The rangefinding instrument of claim 21 wherein said mirror redirects said at least a portion of said visible light passing through said second partial mirror back toward said second partial mirror for redirection to said aperture.

23. The rangefinding instrument of claim 19 wherein said second partial mirror is positioned substantially 45° to a path of said visible light beam directed to said target.

24. The range finding instrument of claim 16 further comprising:
a laser detection diode for receiving a portion of said rangefinding beam reflected from said target.

25. The rangefinding instrument of claim 17 wherein said first partial mirror is positioned substantially 45° to a path of said rangefinding beam directed to said target.

26. The rangefinding instrument of claim 24 further comprising:
a focusing lens interposed between said target and said laser detection diode.

27. The rangefinding instrument of claim 16 wherein said rangefinding beam and said visible light beam are substantially parallel to a common optical axis.

28. The rangefinding instrument of claim 27 wherein said rangefinding beam and said visible light beam are substantially coaxial.

29. The rangefinding instrument of claim 16 wherein said visible light beam comprises a phase modulated laser beam.

30. A method for establishing a virtual aiming reference in a laser rangefinding instrument comprising:
providing an eyepiece to enable a view of a target by a user of said laser rangefinding instrument;
providing a visible laser beam from a visible light emitting source; and
directing a first portion of said visible laser beam toward said target and a second portion of said visible laser beam toward said eyepiece.

31. The method of claim 30 wherein said first portion of said visible laser beam is greater than said second portion.

32. The method of claim 30 wherein said first portion of said visible laser beam is substantially 95%.

33. The method of claim 30 wherein said step of directing is carried out by a partial mirror.

34. The method of claim 30 wherein said step of directing is carried out by reflection from a window through which said first portion of said visible laser beam is emitted.

35. The method of claim 30 wherein said visible laser beam is a phase modulated laser beam.

36. The method of claim 30 further comprising:
emitting a pulse modulated laser beam toward said target.

37. The method of claim 36 wherein said pulse modulated laser beam is substantially coaxial with said visible laser beam.

38. The method of claim 30 further comprising:
phase modulating said visible light beam.

* * * * *